(No Model.) 7 Sheets—Sheet 1.

T. R. ALMOND.
FLEXIBLE COUPLING.

No. 539,161. Patented May 14, 1895.

WITNESSES:

INVENTOR
Thomas R. Almond,
BY Briesen & Knauth
his ATTORNEYS (No Model.) 7 Sheets—Sheet 2.
T. R. ALMOND.
FLEXIBLE COUPLING.
No. 539,161. Patented May 14, 1895.
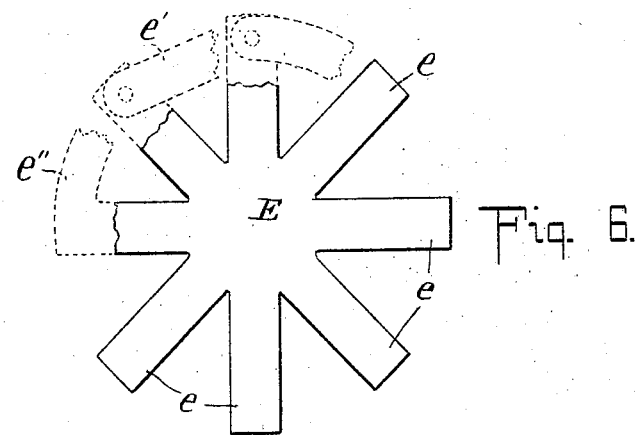
Fig. 6.
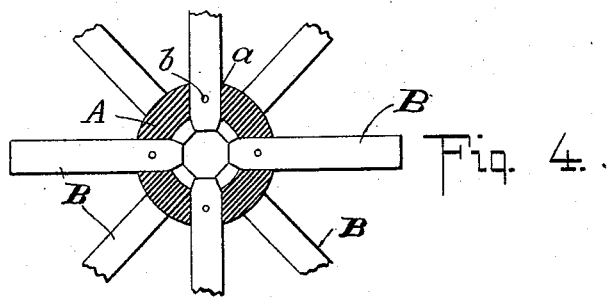
Fig. 4.
Fig. 5.
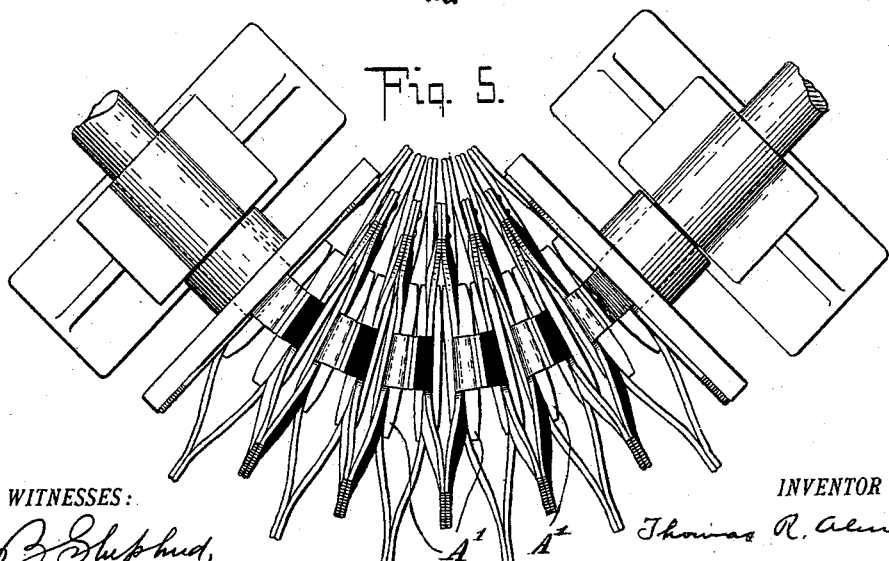
WITNESSES:
INVENTOR
Thomas R. Almond
BY Briesen & Knauth
his ATTORNEYS (No Model.)  7 Sheets—Sheet 3.

T. R. ALMOND.
FLEXIBLE COUPLING.

No. 539,161.  Patented May 14, 1895.

WITNESSES:

INVENTOR
Thomas R. Almond
BY Briesen & Knauth
his ATTORNEYS.

(No Model.)  7 Sheets—Sheet 4.
T. R. ALMOND.
FLEXIBLE COUPLING.
No. 539,161.  Patented May 14, 1895.
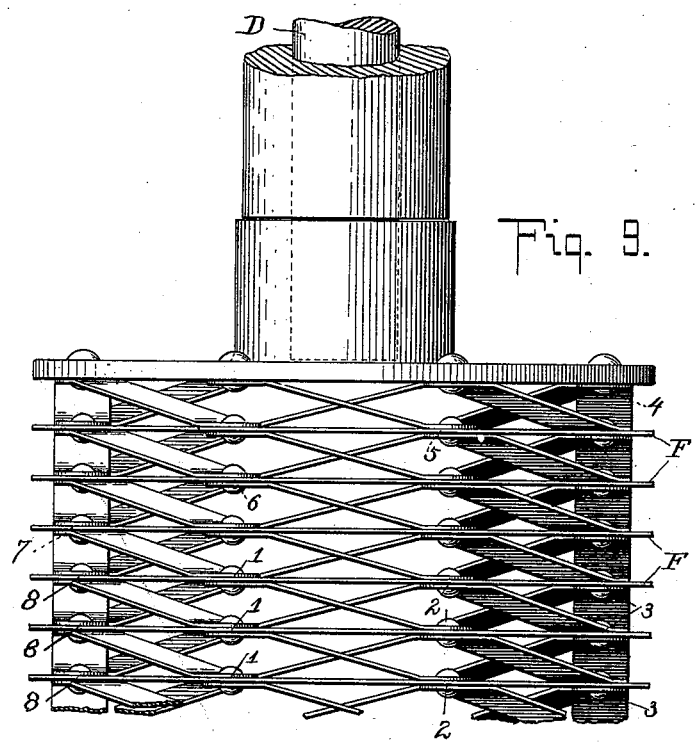
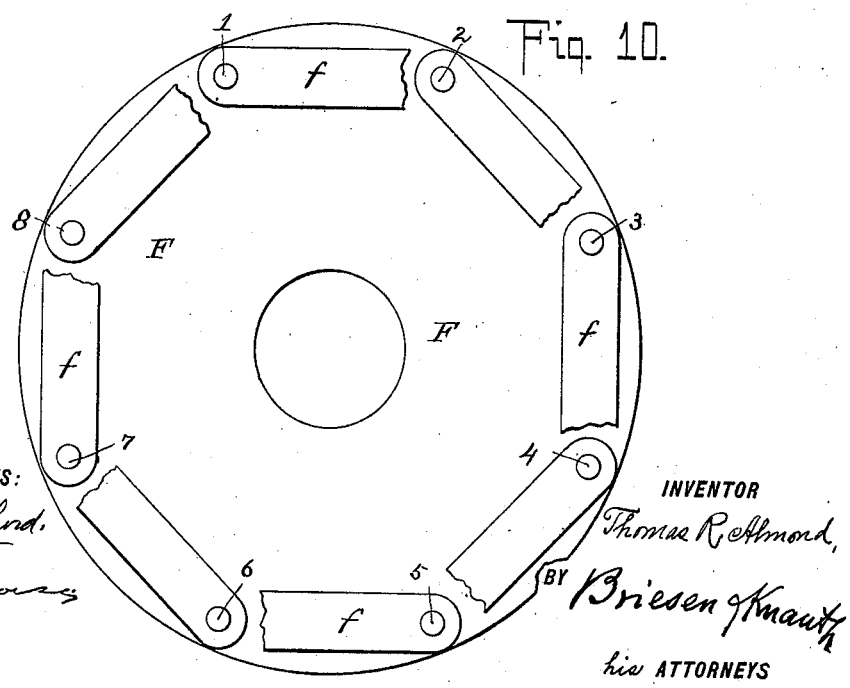
WITNESSES:
INVENTOR
Thomas R. Almond,
BY Briesen & Knauth
his ATTORNEYS (No Model.) 7 Sheets—Sheet 5.

T. R. ALMOND.
FLEXIBLE COUPLING.

No. 539,161. Patented May 14, 1895.

WITNESSES:

INVENTOR
Thomas R. Almond,
BY Briesen & Knauth
his ATTORNEYS.

(No Model.) 7 Sheets—Sheet 6.

T. R. ALMOND.
FLEXIBLE COUPLING.

No. 539,161. Patented May 14, 1895.

WITNESSES:

INVENTOR
Thomas R. Almond,
BY Briesen & Knauth
his ATTORNEYS

THE NORRIS PETERS CO., PHOTO-LITHO., WASHINGTON, D. C.

(No Model.) 7 Sheets—Sheet 7.

T. R. ALMOND.
FLEXIBLE COUPLING.

No. 539,161. Patented May 14, 1895.

WITNESSES:

INVENTOR
Thomas R. Almond,
BY Briesen & Knauth
his ATTORNEYS.

UNITED STATES PATENT OFFICE.

THOMAS R. ALMOND, OF DUNWOODIE HEIGHTS, NEW YORK.

FLEXIBLE COUPLING.

SPECIFICATION forming part of Letters Patent No. 539,161, dated May 14, 1895.

Application filed September 27, 1894. Serial No. 524,235. (No model.)

*To all whom it may concern:*

Be it known that I, THOMAS R. ALMOND, a resident of Dunwoodie Heights, Westchester county, and State of New York, have invented certain new and useful Improvements in Flexible Couplings, of which the following is a specification.

My invention relates to flexible couplings for shafts, and consists in the construction hereinafter fully set forth and claimed.

My invention will be understood by reference to the accompanying drawings, in which—

Figure 1:
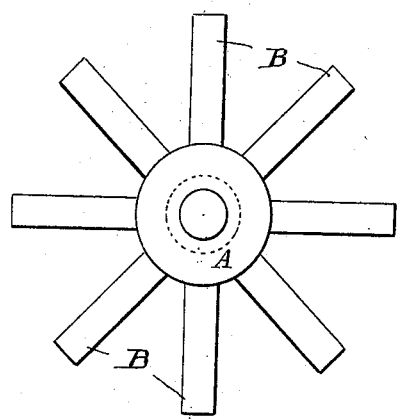
Figure 2:
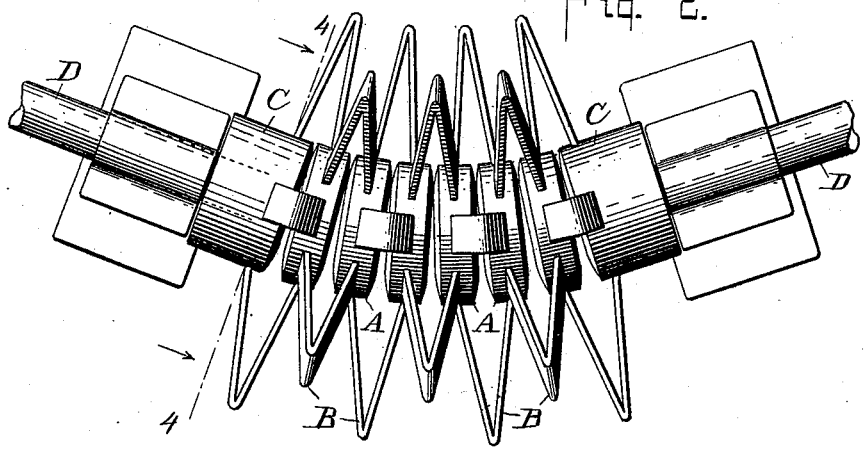
Figure 3:
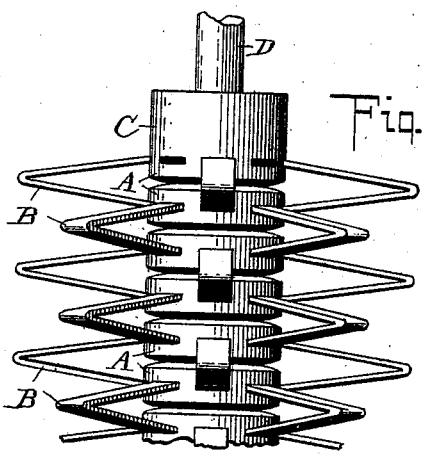
Figure 7:
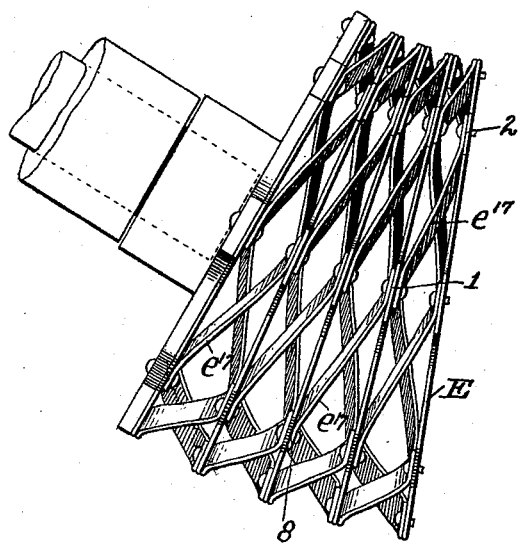
Figure 8:
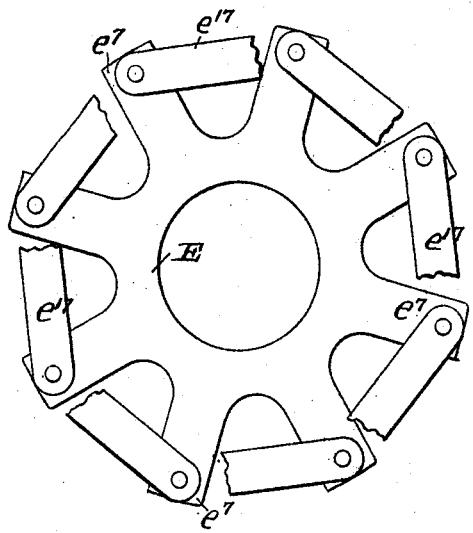
Figure 11:
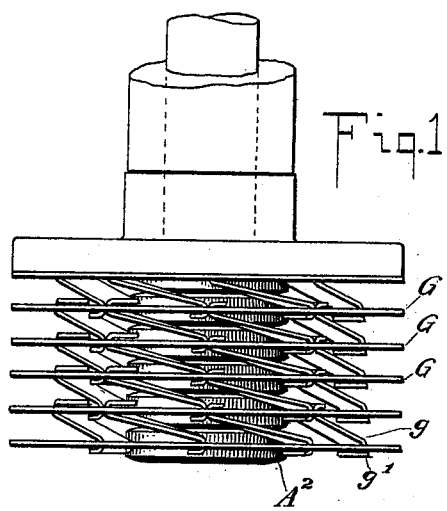
Figure 13:
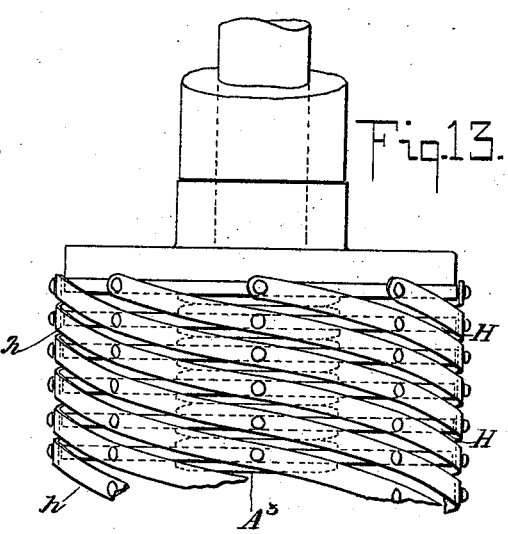
Figure 12:
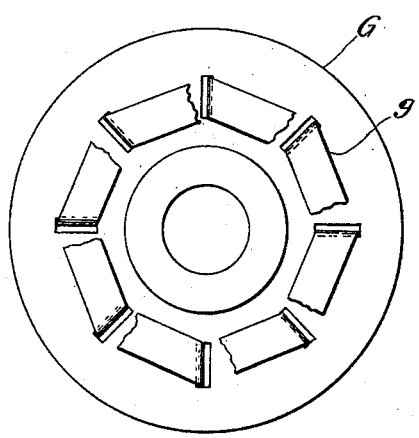
Figure 14:
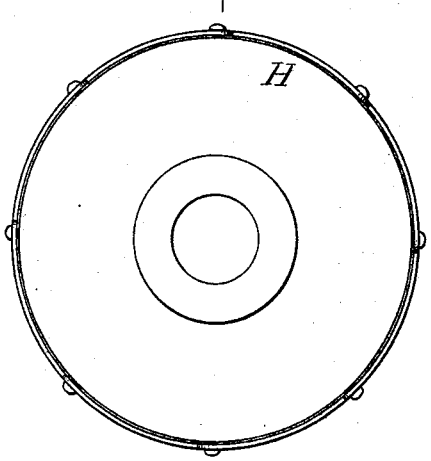
Figure 15:
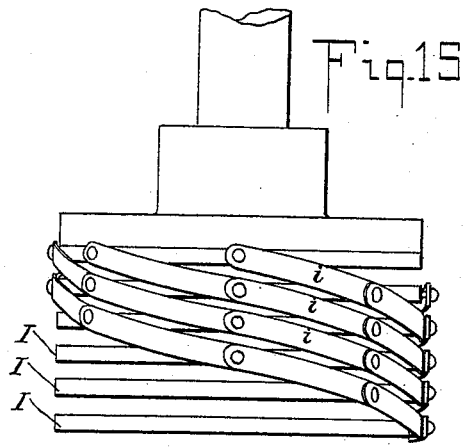
Figure 17:
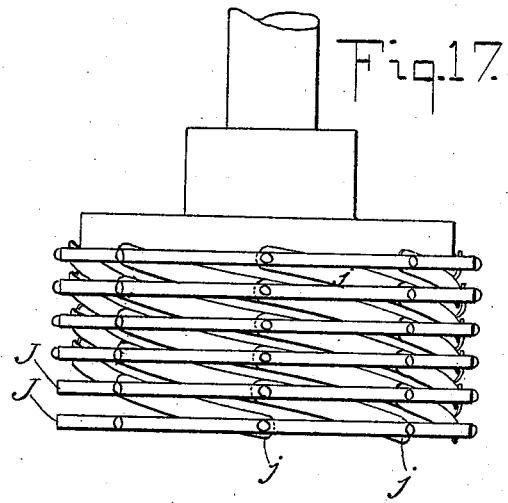
Figure 16:
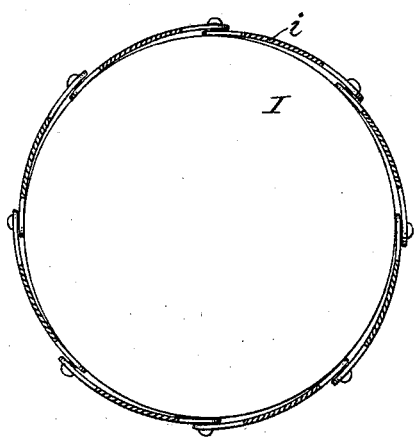
Figure 18:
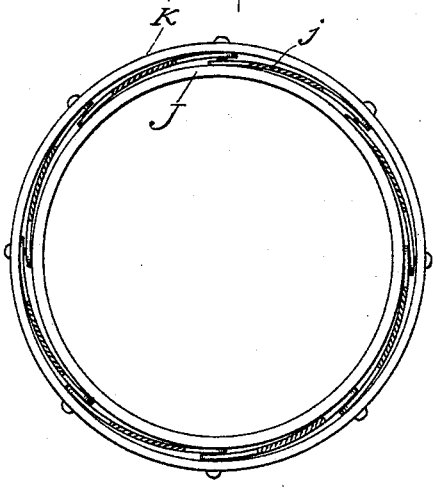
Figure 19:
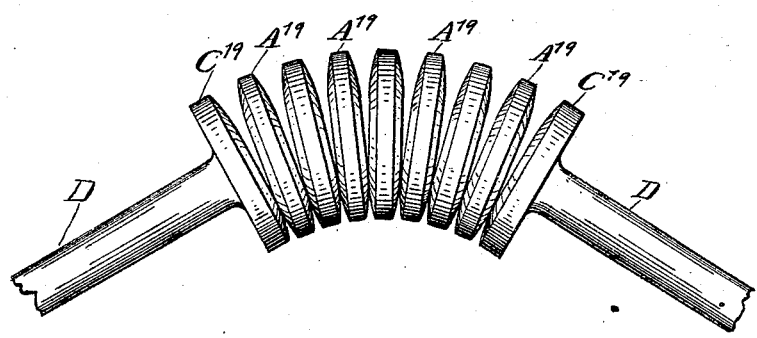

Figure 1 is an end view of one form of my invention. Fig. 2 is a plan view of the form of my invention illustrated in Fig. 1, showing the same as it appears when coupling two shafts placed at an angle to each other. Fig. 3 is a broken-away plan view of the same form of my invention as is shown in the preceding figures, showing the same, however, as it appears when coupling two shafts in the same straight line. Fig. 4 is a section on line 4 4 of Fig. 2, showing the method of fastening the elastic connecting pieces. Fig. 5 is a plan view of the preferred form of my invention shown as coupling two shafts disposed angularly to each other. Fig. 6 is a fragmentary detail view showing in full lines a broken-away detail of the construction shown in Fig. 5, and in dotted lines modifications thereof. Fig. 7 exhibits another modified form of my invention. Fig. 8 is a detail view thereof in isometric projection. Fig. 9 is a plan view of another form of my invention, and Fig. 10 is a detail view thereof in isometric projection. Fig. 11 is a detail plan view of another form of my invention, and Fig. 12 is a detail view thereof in isometric projection. Fig. 13 is a plan view of another form of my invention. Fig. 14 is a detail view thereof in isometric projection. Fig. 15 is a plan view of another form of my invention. Fig. 16 is a detail view thereof in isometric projection. Fig. 17 is a plan view of another form of my invention. Fig. 18 is a detail view thereof in isometric projection. Fig. 19 is a diagrammatic view illustrating the principle of operation of a certain form of my invention, and Fig. 20 is a section through one of the rings or disks shown in Fig. 19.

Referring particularly to Figs. 1 to 4, A A are disks, plates or rings or their equivalents connected one to the other by elastic connecting strips or couplings B. These strips or couplings are disposed around the circumference of the disks and may be of any suitable number and disposition. In the present instance I employ eight strips or couplings around the circumference of each disk, which strips or couplings are entered into slots $a$ and held in place by pins $b$ or otherwise fastened. (See Fig. 4.) I have also shown one set of four connecting strips or couplings of each disk as connected to the adjoining disk on one side and the other set of four connecting strips or couplings as connected to the adjoining disk on the other side, the connecting links or couplings of either set being alternately placed around the periphery of the first mentioned disk. It will also be observed by reference to Fig. 4 that the inner ends of the connecting strips or couplings B are beveled and fit against one another at or near the center of the ring or aforementioned disk. At either end of the series the disks are connected to end disks, hubs or enlargements C to which the shafts D are connected and which are in close proxmity to the bearings of said shaft as shown.

From the foregoing explanation it will be quite obvious that when one shaft is rotated it will communicate a rotary movement to the other shaft through the medium of the flexible coupling, and owing to the extreme flexibility of the coupling the shafts may be placed at considerable angles.

Figure 20:
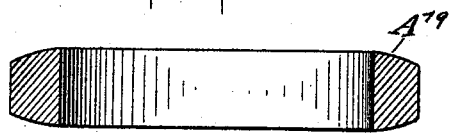

Referring now to Figs. 19 and 20, which show a theoretical diagram, it will be observed that the disks $A^{19}$ which are the equivalents of the disks A in Figs. 1 to 4 contact one with another, the series terminating in end disks $C^{19}$ and shafts D, as before mentioned, and if the disks be held in place in any suitable manner and one shaft D be revolved, the rotary motion will be communicated to the disks which will roll one upon the other and communicate the rotation to the other shaft D. These disks may be connected in any suitable manner in order to hold them in position during movement of the shafts.

Referring particularly to Fig. 2, it will be observed that the axes of the line of disks or rings will form practically a curved line connecting the axes of the shafts, and that the planes of the disks or rings will coincide with the radii of this curve, and as the disks rotate in the plane of these radial lines, the points of connection of any coupling strip with the disks will separate and come together, the strips or couplings by their flexibility and elasticity allowing such movement.

In the modification shown in Figs. 5 and 6, the coupling is made up of a series of disks or plates, each consisting of a central disk portion E having arms or couplings $e$ which are or may be integral with the before-mentioned central or disk portion. A number of these disks or plates are placed in series and alternate arms of each disk or plate are connected to adjacent disks or plates on either side. This construction is shown in plan in Fig. 5. The operation thereof will be evident from an inspection of the figure. I may also interpose between adjacent disks suitable spacing disks or contact hubs A' which serve to prevent the extremities of the joined arms from coming in contact with the extremities of adjacent joined arms, but these spacing disks or contact hubs may be omitted, if desired, they not being essential to the operation of the device. Instead of connecting the arms $e$ directly with adjacent arms or couplings of adjacent disks or plates, they may be connected by flexible or elastic couplings $e'$ fastening one arm to another, or the coupling-pieces may be made integral with the arms, as shown at $e''$.

Figs. 7 and 8 show a modification in which the plates or disks consist of a central portion E and arms $e^7$ and connecting pieces or couplings $e^{17}$. In this modification the individual arms $e$ of any disk or plate E are connected to an arm of each adjacent plate, the connections or couplings running not to arms in line with the first mentioned arm, but to arms in lines on either side of the first mentioned arm, that is to say, supposing the arms or couplings to be numbered consecutively from one to eight around the disk or plate and similarly disposed in each disk or plate, then taking any individual disk or plate; arm or coupling No. 1 will be connected to arm or coupling No. 8 of the disk or plate on one side of the first mentioned disk or plate and the arm No. 2 of the plate on the other side of the first mentioned disk or plate, as shown in Fig. 7, wherein the arm No. 1 of the third disk or plate in the series is shown so connected. It will be noted, however, that in Fig. 7 the positions of the parts have been shown slightly distorted for the purpose of clearer illustration.

In the modification shown in Figs. 9 and 10 the construction closely approximates the construction of the modification shown in Figs. 7 and 8. In this construction a series of disks or plates F are connected together by couplings $f$ which are riveted to the disks or plates, or other suitable connecting pieces may be employed, which couplings are preferably symmetrically disposed around the disk. In the present instance there are eight connecting pieces or couplings between each disk, the points of connection being symmetrically disposed in line with one another. Supposing these points of connection to be numbered from one to eight in each disk and similarly disposed, adjacent disks are connected as follows: Take for instance the fifth disk in the series and start from the point 1. The point 1 on the fifth disk will be connected to the point 2 on the sixth disk and to the point 8 on the fourth disk, and so on around the disks and throughout the series. The operation of this form of my invention is similar to that of the preceding forms, that is to say, when the coupling is bent to couple shafts angularly disposed toward each other, the disk will rotate in planes forming radii to the curve of the axes of the coupling, and the connections or couplings will bend, as before, when the shafts are rotated.

In the modification shown in Figs. 11 and 12, G G are series of disks or plates and $g$ are the couplings. These couplings are provided with hooked ends $g'$, which ends engage in slots in the disks or plates. The disks or plates G may also be provided with spacing disks or contact hubs $A^2$, as shown. The operation of this form will be evident from the explanations given as to the operations of the preceding forms.

In the modification shown in Figs. 13 and 14, H H are series of disks or plates which may be provided with spacing disks or contact hubs, $A^3$, as shown, which are connected by the continuous strips or couplings $h$ secured to one or more points on the periphery of each disk and running around the coupling from one end to the other in spiral lines.

The modification shown in Figs. 15 and 16 is in many respects similar to the form of my invention just described. In this form the series of disks I I are connected by couplings or connecting pieces or strips $i$ $i$ which lap one upon the other, each series running in a spiral line from one end of the coupling to the other.

In Figs. 17 and 18, instead of using a solid disk or plate, as in the preceding modifications of my invention, I cut away the disk until it is a mere ring or annulus J, such a ring being in this structure the full equivalent of a disk, and right here I wish to have it understood that where I use the words "disks or plates" I wish to be understood as including all equivalent structures, such, for instance, as this ring. A series of these rings (disks) are connected to one another by a series of couplings or strips $j$, and each ring with its connected coupling is surrounded by a ring K which adds rigidity to the structure.

It will be observed that in the various modifications described the connections or couplings are flexible as well as elastic, and being also stiff serve to support the disks in position as well as to transmit the power from disk to disk.

Now while I have described these various forms of my invention specifically and in positive terms, I do not mean to thereby limit myself to the specific constructions herein set forth and illustrated, but in using the terms which I have employed I would have it understood that I wish to include thereby such structures as may be considered equivalent structures, in view of the state of the art, as it will be evident that other and analogous forms will readily suggest themselves to those who may desire to enjoy the fruits of my invention. It will also be observed that in the various forms of my invention illustrated an enlargement is provided at the end of each of the shafts, to which enlargement the coupling is connected. While I have shown such enlargements, I would have it understood that I do not limit myself thereto, since they may be dispensed with.

What I claim, and desire to secure by Letters Patent, is—

1. A flexible coupling consisting of series of disks or plates and elastic connections which are secured to said disks respectively and which unite and support said disks in their relative positions, substantially as described.

2. A flexible coupling consisting of series of disks or plates and flexible connections disposed outside of the periphery of the said disks or plates uniting the same one to another, substantially as described.

3. A flexible coupling consisting of series of disks or plates and flexible connections uniting the same one to another and spacing disks or contact hubs interposed between the plates or disks, substantially as described.

4. A coupling consisting of series of disks or plates, flexible connections integral with the disks or plates, said connections uniting the plates one to the other substantially as described.

5. A coupling consisting of series of disks or plates, coupling-pieces arranged around the periphery of the disks, alternate coupling-pieces of each disk being connected to disks on opposite sides respectively of the first mentioned disk, substantially as described.

6. A coupling consisting of series of disks or plates, the said disks or plates each consisting of a central portion and arms projecting therefrom, arms of each plate being connected to portions of adjacent plates on either side of the first named plate, substantially as described.

7. The combination with shafts and bearings therefor, of series of disks or plates and elastic connections uniting the same one to another and serving to sustain the said disks in position, substantially as described.

8. The combination of two shafts, each provided with an enlargement, of disks intervening between the enlargements connected to each other and to the said enlargements by elastic couplings which couplings serve to transmit the power and to sustain the said disks in position, substantially as described.

THOMAS R. ALMOND.

Witnesses:
HARRY M. TURK,
GEO. E. MORSE.